(12) United States Patent
Sato et al.

(10) Patent No.: US 7,052,042 B2
(45) Date of Patent: May 30, 2006

(54) AIR BAG SYSTEM

(75) Inventors: Masahiro Sato, Saitama (JP); Kenichi Saito, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/997,334

(22) Filed: Nov. 30, 2001

(65) Prior Publication Data

US 2002/0067033 A1  Jun. 6, 2002

(30) Foreign Application Priority Data

Dec. 1, 2000 (JP) .............................. 2000-367778

(51) Int. Cl.
*B60R 21/16* (2006.01)

(52) U.S. Cl. .................. 280/743.1; 280/743.2
(58) Field of Classification Search ............ 280/743.1, 280/728.1, 743.2
See application file for complete search history.

(56) References Cited

U.S. PATENT DOCUMENTS

| | | | | |
|---|---|---|---|---|
| 5,007,662 A | * | 4/1991 | Abramczyk et al. | 280/739 |
| 5,427,410 A | * | 6/1995 | Shiota et al. | 280/743.1 |
| 5,593,179 A | * | 1/1997 | Maruyama | 280/743.1 |
| 5,857,696 A | * | 1/1999 | Inoue et al. | 280/743.1 |
| 6,572,144 B1 | * | 6/2003 | Igawa | 280/743.1 |
| 2002/0089158 A1 | * | 7/2002 | Fischer et al. | 280/743.1 |

FOREIGN PATENT DOCUMENTS

| | | | | |
|---|---|---|---|---|
| JP | 4135940 | * | 5/1992 | 280/728 R |
| JP | 10-029490 | | 2/1998 | |
| JP | 10-166981 | | 6/1998 | |
| JP | 2000-142291 | | 5/2000 | |
| WO | WO 9942334 | | 8/1999 | |

* cited by examiner

*Primary Examiner*—Eric Culbreth
(74) *Attorney, Agent, or Firm*—Carrier, Blackman & Associates, P.C.; Joseph P. Carrier; William D. Blackman (57) ABSTRACT

An air bag system which is housed in an instrument panel and in which an inflator is ignited by a signal from an acceleration sensor at the time of frontal collision of a vehicle, whereby an air bag is deployed by gas generated so as to restrain a front seat occupant, the air bag having an opening through which the generated gas is allowed to flow into the air bag, an occupant restraint portion, a gas flow path portion between the opening and the occupant restraint portion, and at least one penetrating portion or joint portion located within the air bag for dividing the gas flow path portion into multiple flow paths.

2 Claims, 8 Drawing Sheets

AIR BAG SYSTEM

BACKGROUND OF THE INVENTION

The present invention relates to an air bag system housed in an instrument panel in front of a front occupant seat of a vehicle. More particularly, the present invention relates to an air bag system dealing with air bags of which various sizes are required for different car types corresponding to a constant output of an inflator.

DESCRIPTION OF THE RELATED ART

The air bag system is housed in a housing portion in a front instrument panel. The air bag is housed in a folding state in a retainer of the air bag system. High-pressure gas generated from an inflator is introduced into the air bag at the time of a collision of a vehicle, so that the air bag is inflated toward a front seat occupant for retraining the forward movement of the occupant due to inertia force.

In air bag systems, different sizes of air bags are required to be housed corresponding to different car types which individually require different restraining performances. It is true in the current situation that there is a big difference in sizes between car types.

Since an air bag is inflated with high-pressure gas generated from an inflator (a gas generating device), the sizes of the air bag are one of factors to determine the output of the inflator. As the sizes of the air bag are expanded, the volume thereof is increased. The increasing volume leads to a requirement of an inflator having a higher output.

As a result, inflators having different outputs need to be prepared for air bags of different sizes and volumes, and therefore the compatibility of air bag systems of the related art among car types remains low.

SUMMARY OF THE INVENTION

It is an object of the present invention to provide an air bag which can properly use various sizes of air bags corresponding to a constant output of an inflator, which are required for different car types.

In view of the aforesaid problem, after earnest studies the inventors have come to a conclusion that the problem may be solved by an air bag system including an air bag in a folded state housed in an instrumental panel, the air bag inflated by an inflator when a vehicle is crashed, wherein the air bag comprises:

an opening portion into which a gas generated by the inflator flows;

a gas flows path portion; and an occupant restraint portion, wherein the gas flows from the opening plortion to the occupant restraint portion through the gas flow path portion.

Namely, the air bag system according to an embodiment of the present invention is characterized by providing at least one flow-constricting penetrating portion in the air bag.

In addition, the air bag system according to another embodiment of the invention is characterized by provision of at least one flow-constricting joint portion in the air bag.

Furthermore, it is possible to provide both the penetrating portion(s) and the joint portion(s) in the air bag.

It is preferable to provide the penetrating portion and/or the joint portion in the gas flow path portion of the air bag to divide the gas flow portion into multiple gas flow paths. This allows only the volume of the gas flow path portion to be adjusted, while keeping restraining performance of the air bag.

The penetrating portion and/or the joint portion may be provided between the opening portion and the gas flow path portion of the air bag, whereby the gas flow path portion may be divided into multiple gas flow paths.

BRIEF DESCRIPTION OF THE DRAWINGS

FIGS. 16(a) and 16 (b) are cross-sectional views similar to FIG. 15 showing a modification of the air bag in FIG. 14, in which FIG. 16(a) shows the air bag in a folded up state and FIG. 16(b) shows the air bag in an inflated state;

DESCRIPTION OF THE PREFFRRED EMBODIMENTS

Figure 1:
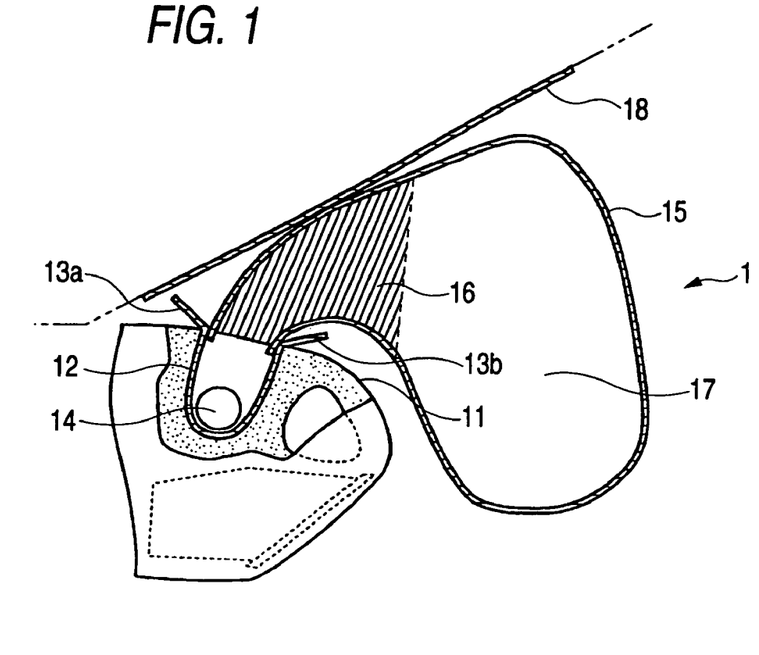
FIG. 1 is a cross-sectional view of an instrument panel portion where an air bag according to the invention is housed.

FIG. 1 is a cross-sectional view showing the deployed state of an air bag of one embodiment of an air bag system according to the present invention.

As shown in FIG. 1, the air bag system 1 is preferably housed at an upper portion in an instrument panel 11. The air bag system 1 comprises:

an airtight container-like retainer 12 which opens to an upper surface of the instrument panel 11; and lids 13a and 13b which close an upper end opening of the retainer 12.

An inflator 14 and an air bag 15 are accommodated in the interior of the retainer 12. The interior of the retainer has an air bag housing portion. The inflator 14 is a container including a gas generating agent such as pyrotechnic material. When a collision is detected through deceleration of a vehicle, the gas generating agent is ignited and high-pressure gas is then gushed or rapidly expelled out. The air bag 15 is something like a bag which opens at one end thereof. The air bag 15 is joined airtight at the opening portion thereof to the retainer in such a manner that a gas generated from the inflator 14 flows in the air bag 15.

When the speed of the vehicle is drastically reduced due to a collision or the like, an acceleration sensor detects the deceleration of the vehicle to ignite the gas generating agent in the inflator 14. Then, high-pressure gas is gushed out and the air bag 15 is pressed against lower surfaces of the lids 13a and 13b. As a result, the lids 13a and 13b are then pushed up to rotate upwardly to thereby open the upper end opening of the retainer 12. Therefore, the air bag 15 is inflated through the opening.

The air bag 15 comprises the opening, a gas flow path portion 16 and an occupant restraint portion 17. The gas flow path portion 16 is a portion which substantially covers only an upper surface of the instrument panel when the air bag is inflated and which provides a narrow throated gas passageway between the opening portion and the occupant restraint portion.

The gas flowing out of the inflator 14 passes through the gas flow path portion 16 of the air bag via a gas flow-in portion in the retainer 12 and flows into the occupant restraint portion 17.

The air bag 15 is made of an airtight and soft material such as a nylon woven fabric and is preferably formed into a bag-like configuration using polyamide threads. In addition, it is preferable to have rubber or silicone having heat resistance coated on an internal surface of the air bag 15.

According to the air bag system of the present invention, the volume of air bags may be maintained constant by providing a flow-constricting penetrating portion or portions and/or a flow-constricting joint portion or portions in predetermined sizes in the air bag. As shown, the flow-constricting portion(s) are disposed adjacent to the opening portion of the airbag, where such portion(s) reduce the volume of the gas flow path portion and function to regulate the rate at which gas from the inflator flows into the airbag. Due to this, the same size inflator may be used on different car types while maintaining the occupant restraining performance of the air bag.

It is preferable to provide the penetrating portion or portions and/or the joint portion or portions in the above gas flow path portion, whereby only the volume of the gas flow portion is adjusted and the maintenance of the occupant restraining performance can be eased.

An example will be described in which the gas flow path portion is penetrating partially into at least one of the flow paths by providing the penetrating portion in the gas flow path portion.

Figure 2:
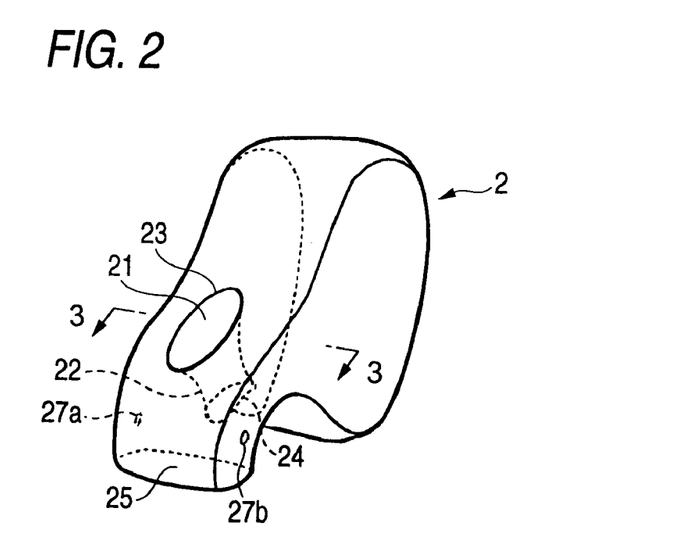
FIG. 2 is a perspective view showing an air bag according to one embodiment of the present invention.
Figure 3:
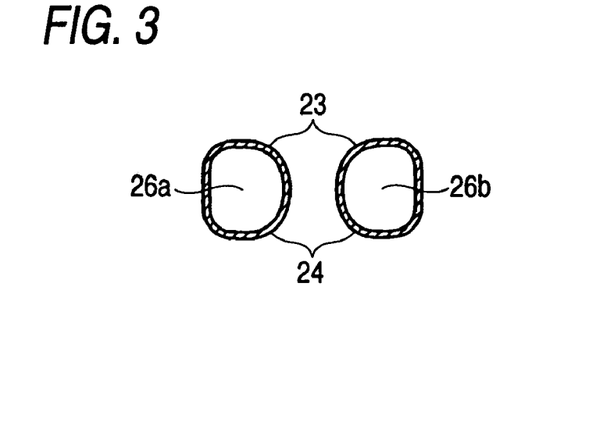
FIG. 3 is a cross-sectional view of the air bag taken along the line 3—3 thereof in FIG. 2.

FIG. 2 is a perspective view showing a completely inflating state of an air bag having a penetrating portion. FIG. 3 is a cross-sectional view of the air bag taken along the line 3—3 in FIG. 2.

The penetrating portion 21 may be formed, whereby a panel 22 joins an opening hole in an upper panel of the gas flow path portion with a hole in an lower panel thereof. The panel 22 is a separate component extending along ports of the holes for the penetrating portion. The joining of the panel 22 can be implemented using a suturing method, a thermal fusing method or a bonding method using an adhesive (reference numerals 23 and 24 denoting sutured portions).

The gas generated from the inflator passes through an opening 25, then flows into flow paths 26a and 26b which are situated on sides of the penetrating portion 21 in the gas flow path portion, and finally flows into the occupant restraint portion.

Furthermore, preferably vent holes are provided in an air bag for exhausting the gas.

In the air bag 2, as shown in FIG. 2, vent holes 27a and 27b are provided in both side panels thereof.

Figure 4:
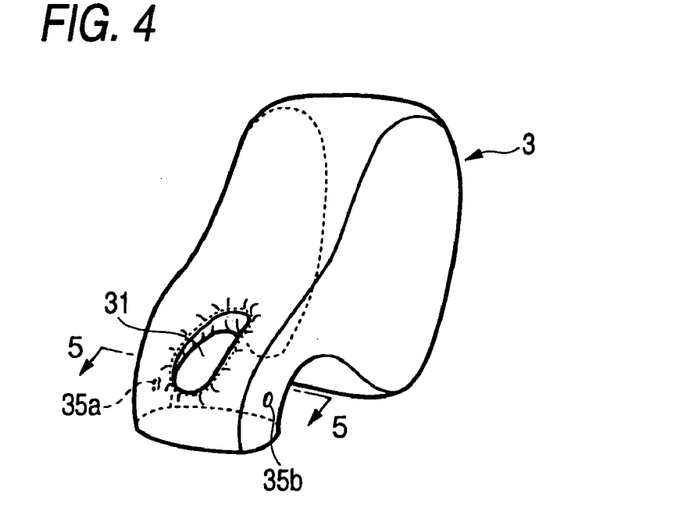
FIG. 4 is a perspective view showing an air bag according to another embodiment of the present invention.
Figure 5:
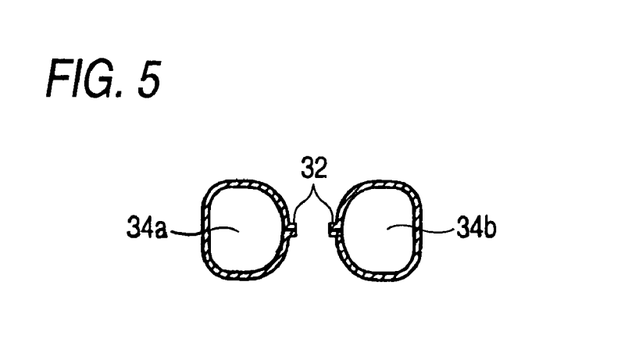
FIG. 5 is a cross-sectional view of the air bag taken along the line 5—5 in FIG. 4.
Figure 6:
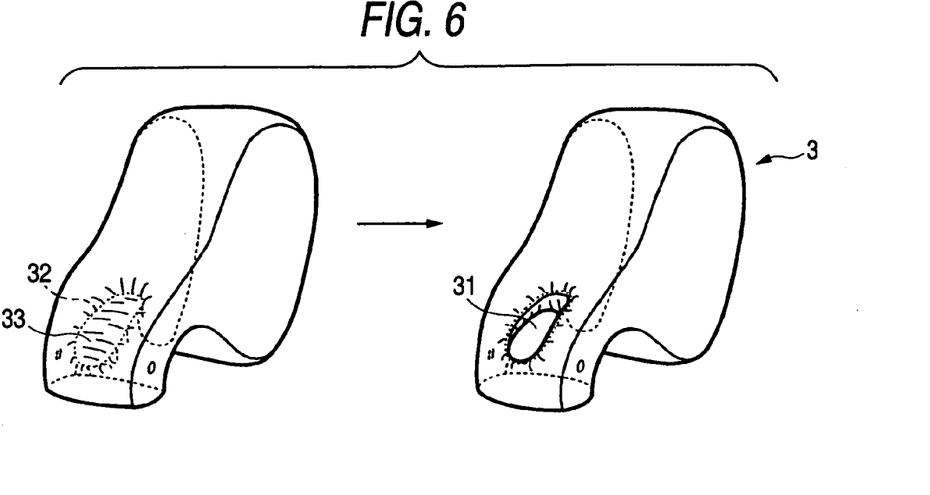
FIG. 6 is a perspective view showing a production process of the air bag shown in FIG. 4.

FIG. 4 is a perspective view showing a completely deployed state of an air bag 3 with a penetrating portion according to another example, and FIG. 5 is a cross-sectional view of the air bag 3 taken along the line 5—5 in FIG. 4. In addition, FIG. 6 is a perspective view showing one process for producing the air bag 3. A penetrating portion 31 can be formed by joining parts of upper and lower panels of a gas flow path portion in an oval fashion through suturing and then cutting out a joint portion 33 inside a sutured portion 32. Preferably polyamide threads are used for suturing. The gas generated from the inflator flows into flow paths 34a and 34b, which are situated on both sides of the penetrating portion in the gas flow path portion, and finally the gas flows into a occupant restraint portion of the air bag.

While there is no limitation to the configuration of the penetrating portion, a circular, oval, square or diamond shape may be preferred since the shapes can facilitate the formation of the penetrating portion.

Figure 7:
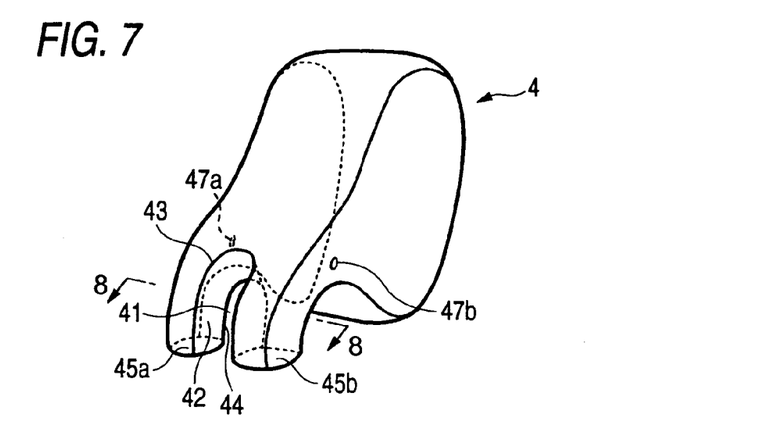
FIG. 7 is a perspective view showing an air bag according to a further embodiment of the present invention.
Figure 8:
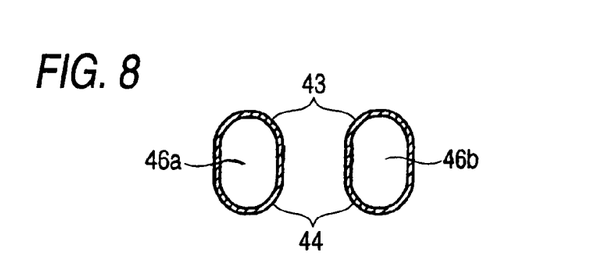
FIG. 8 is a cross-sectional view of the air bag taken along the line 8—8 thereof in FIG. 7.

In addition, the penetrating portion may be provided in an end portion of the penetrating portion attached to the opening of the air bag. FIG. 7 is a perspective view showing a completely inflating state of an air bag according to an example of the invention in which a penetrating portion 41 is provided at an end portion of the gas flow path portion attached to the opening of the air bag. FIG. 8 is a cross-sectional view of the air bag 4 taken along the line 8—8 thereof in FIG. 7. In this case, the openings 45a and 45b of the air bag 4 are formed as a penetrating configuration. The gas passes through the openings 45a and 45b and flows into an occupant restraint portion via flow path portions 46a and 46b. In FIGS. 7–8, 42 indicates a side face, 43 indicates front faces, and 44 indicates rear faces of the flow path portion. Vent holes are indicated at 74a, 47b.

Figure 9:
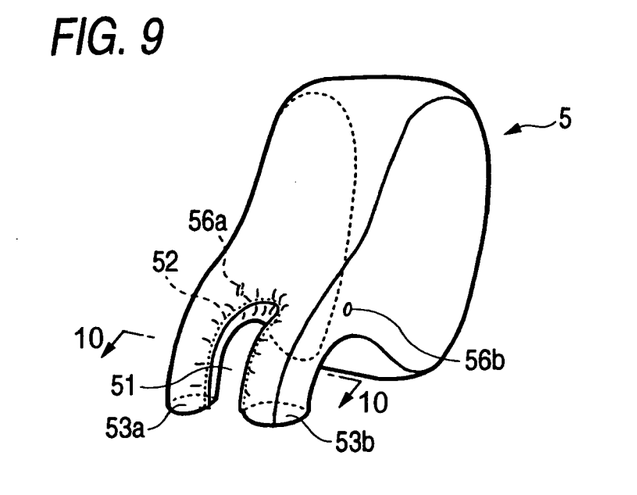
FIG. 9 is a perspective view showing an air bag according to an embodiment of the present invention.
Figure 10:
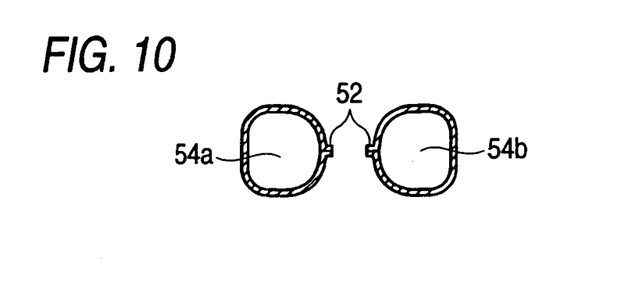
FIG. 10 is a cross-sectional view of the air bag taken along the line 10—10 thereof in FIG. 9.

FIG. 9 is a perspective view showing the completely inflating state of an air bag 5 according to another example of the invention in which a penetrating portion 51 is provided at the end portion of the opening portion. FIG. 10 is a cross-sectional view of the air bag shown in FIG. 9 taken along the line 10—10 thereof. In this case, the openings 53a and 53b of the air bag are formed into a penetrating configuration. The gas passes through the openings 53a and 53b and flows into an occupant restraint portion via the flow paths 54a and 54b. In FIGS. 9–10, 52 indicates a sutured portion, and 56a, 56b are vent holes.

Figure 11:
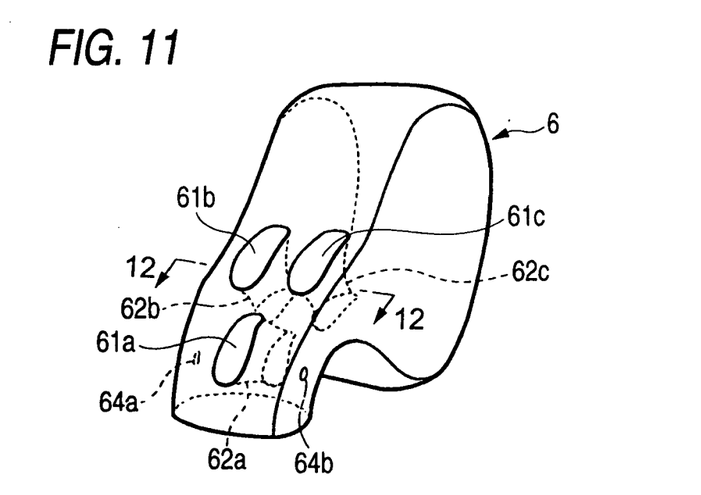
FIG. 11 is a perspective view showing an air bag according to another embodiment of the present invention.
Figure 12:
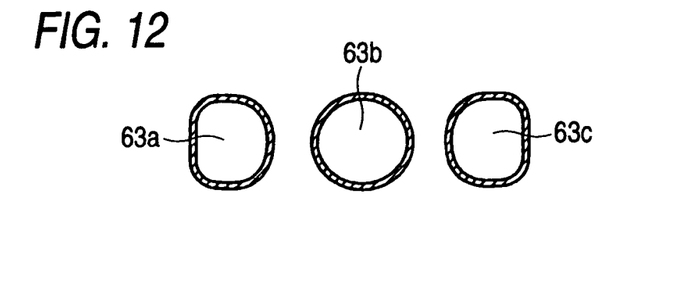
FIG. 12 is a cross-sectional view of the air bag taken along the line 12—12 thereof in FIG. 11.

A plurality of penetrating portions may be provided in the gas flow portion using a method similar to those described heretofore. FIG. 11 is a perspective view showing a completely inflating state of an air bag of an example in which a plurality of penetrating portions are provided in a gas flow path portion. FIG. 12 is a cross-sectional view of the air bag 6 shown in FIG. 11 taken along the line 12—12. The gas flows from a gas flow path portion into flow paths situated on sides of a penetrating portion 61a. The flow path portion is further penetrated at penetrating portions 61b and 61c into flow paths 63a, 63b and 63c and finally flows into the occupant restraint portion. Joining panels are indicated at 62a, 62b, 62, while vent holes are indicated at 64a, 64b.

Additionally, while the penetrating portion preferably pierces the gas flow path portion vertically, the penetrating portion may pierce the gas flow path portion transversely or a combination those vertical and transverse penetrating portions may be adopted.

Figure 13:
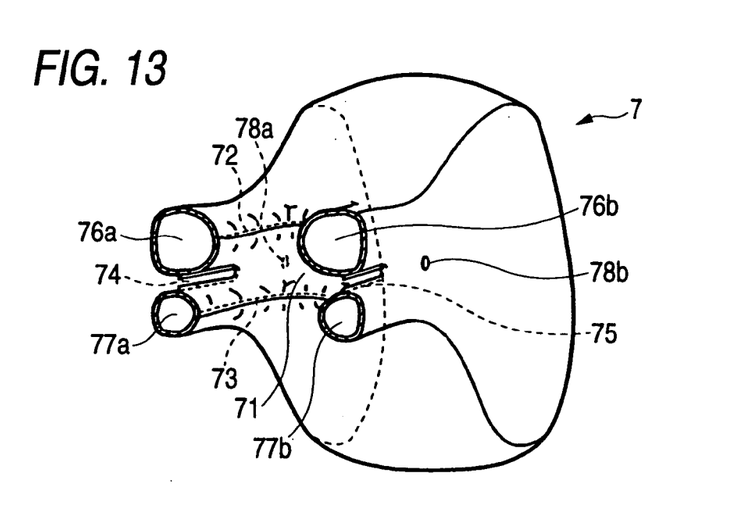
FIG. 13 is a perspective view showing an air bag according to a further embodiment of the present invention.

FIG. 13 is a perspective view showing a completely inflated state of an air bag according to a further example in which penetrating portions are provided in such a manner as to pierce a gas flow path portion vertically and transversely. The penetrating portions of the air bag 7 can be formed by providing notches for vertical penetrating portions in upper and lower panels of the gas flow path portion from openings and suturing a panel 71 which is a separate component (and is provided with notches for transverse penetrating portions) along the notches as shown in FIG. 13 (reference numerals 72, 73, 74 and 75 denoting sutured portions). The opening of the air bag 7 is penetrating into four openings 76a, 76b, 77a, 77b. Vent holes are indicated at 78a, 78b.

However, in case the penetrating portions are provided in such a manner as to start from openings of an air bag, the number and configuration of gas flow-in portions within a retainer should be made to coincide with those of the openings of the air bag.

Figure 14:
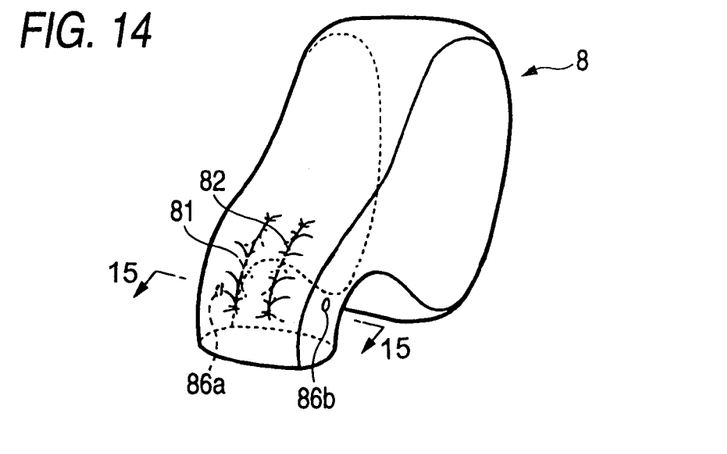
FIG. 14 is a perspective view showing an air bag according to a further embodiment of the present invention.
Figure 15:
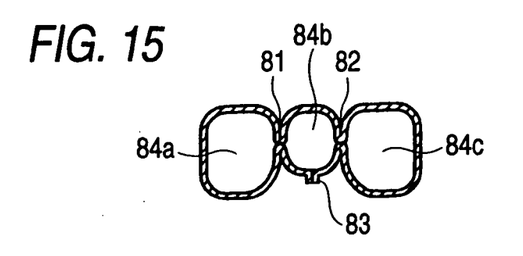
FIG. 15 is a cross-sectional view of the air bag taken along the line 15—15 thereof in FIG. 14.

FIG. 14 is a perspective view showing a completely deployed state of an air bag according to an example in which joint portions are provided, and FIG. 15 is a cross-sectional view of the air bag 8 shown in FIG. 14 taken long the line 15—15 thereof. Joint portions 81 and 82 are formed by linearly joining parts of uppermost and lowermost panels together at two locations in an air bag deployment direction, thereby reducing a volume of the gas flow path portion. A suturing method, a thermal fusing method or a bonding method using an adhesive may be used as a method for joining the upper panel to the lower panel (reference numerals 81 and 82 denoting sutured or joint portions). As shown, three gas flow paths 84a, 84b, 84c are defined in the gas flow path by the joint portions 81, 82. A sutured portion is indicated at 83, and vent holes are indicated at 86a, 86b.

Figure 16:
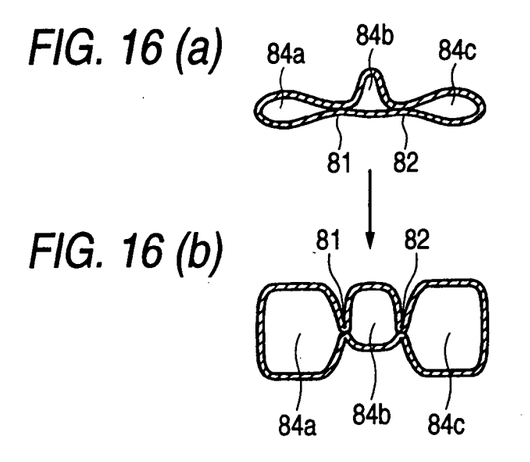

FIGS. 16(a) and 16(b) are cross-sectional views showing the cross section taken along the line 15—15 of the air bag shown in FIG. 14 in another or modified form, in which FIG. 16(a) shows a cross-sectional view prior to deployment in a state in which the air bag is folded up, whereas FIG. 16(b) shows a completely deployed state of the air bag. As shown in FIG. 16(a), the joint portions 81 and 82 are provided in such a manner that there is little sag at a lower surface of a portion constituting a central flow path 84b, and therefore, when deployed the flow path 84 b becomes thinner than flow paths 84a and 84c.

The gas generated from the inflator flows into the three flow paths 84a, 84b and 84c before it flows into a occupant restraint portion.

Figure 17:
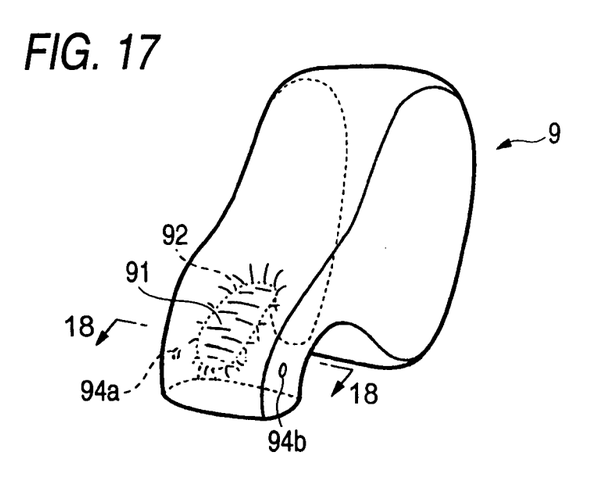
FIG. 17 is a perspective view showing an air bag according to another embodiment of the present invention.
Figure 18:
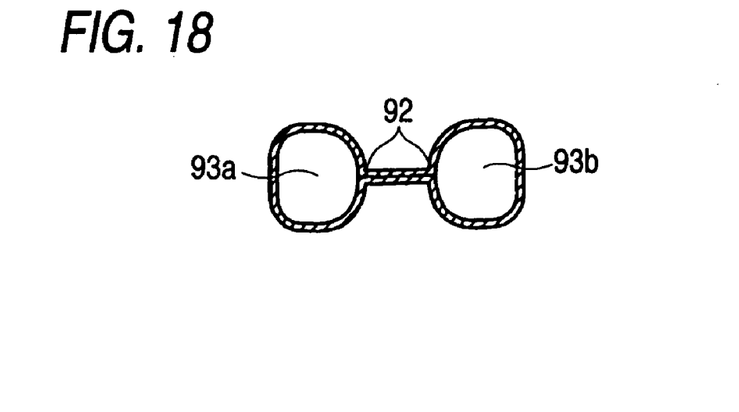
FIG. 18 a cross-sectional view of the air bag taken along the line 18—18 thereof in FIG. 17.

FIG. 17 is a perspective view showing a completely deployed state of an air bag according to another example of the invention in which a joint portion is provided, and FIG. 18 is a cross-sectional view of the air bag 9 shown in FIG. 17 taken along the line 18—18 thereof. A joint portion 91 can be formed by joining parts of upper and lower panels in a gas flow path portion together in an oval fashion, whereby two flow paths 93a and 93b can be formed in the gas flow path portion. Numeral 92 indicates sutured portions, and vent holes are indiated at 94a, 94b.

Figure 19:
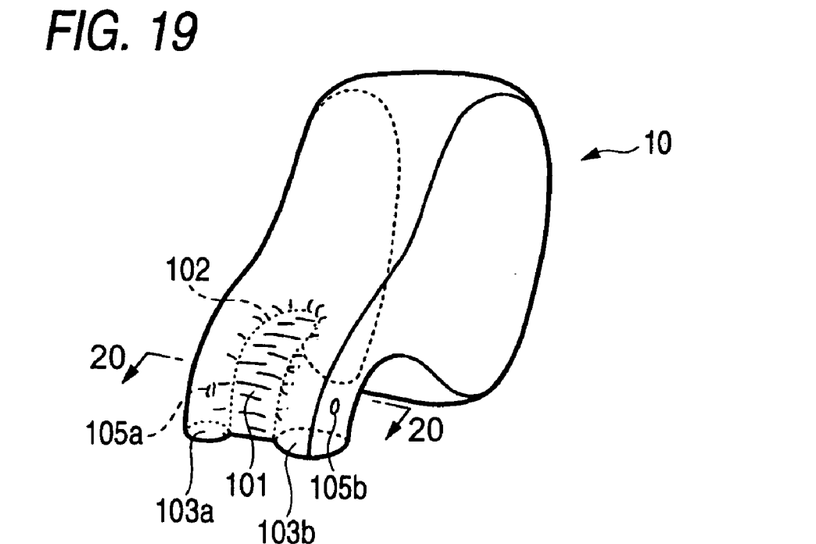
FIG. 19 is a perspective view showing an air bag according to a further embodiment of the present invention.
Figure 20:
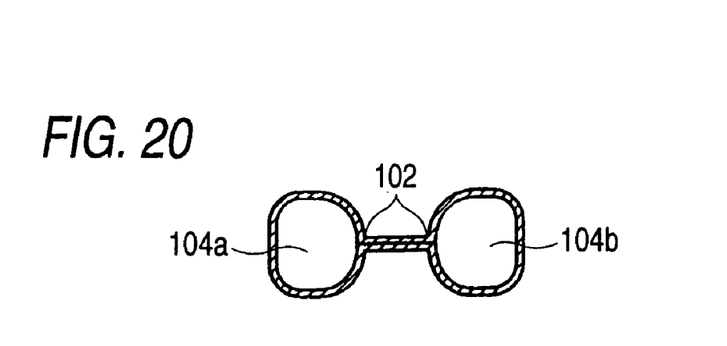
FIG. 20 is a cross-sectional view of the air bag taken along the line 20—20 thereof in FIG. 19.

FIG. 19 is a perspective view showing a completely deployed state of an air bag according to a further example of the inention in which a joint portion is provided in such a manner as to start from an opening portion, and FIG. 20 is a cross-sectional view of the air bag 10 shown in FIG. 19 taken along the line 20—20 thereof. A joint portion 101 can be formed by joining parts of upper and lower panels of a gas flow path portion in such a manner as to form a belt-like configuration extending from the opening portion and having a rounded end, whereby two flow paths 104a and 104b can be formed in the gas flow path portion. In this case, the opening of the air bag is formed into a penetrating configuration which is penetrating into openings 103a and 103b. The gas passes through the openings 103a and 103b and flows into a occupant restraint portion via the flow paths 104a and 104b. In this case, too, however, the number and configuration of gas flow-in portions within a retainer should be made to coincide with those of the openings of the air bag. Numeral 102 indicates sutured portions, and vent holes are indicated at 105a, 105b.

Figure 21:
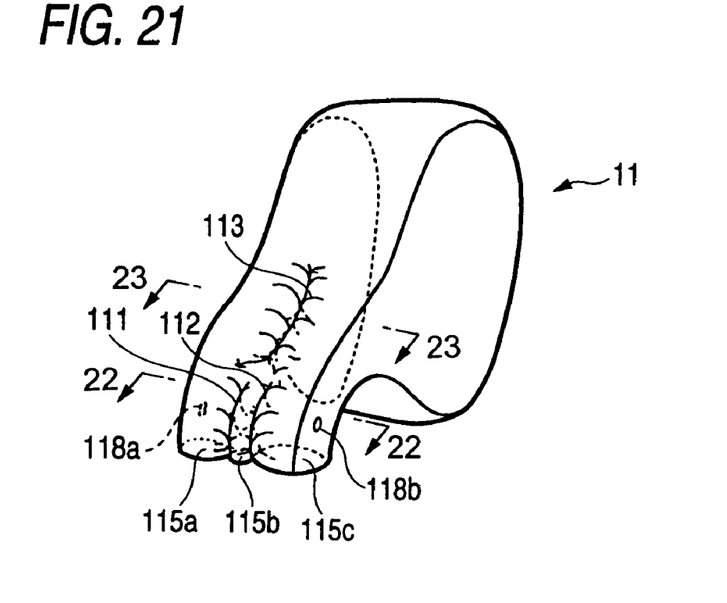
FIG. 21 is a perspective view of the air bag according to a further embodiment of the present invention.
Figure 22:
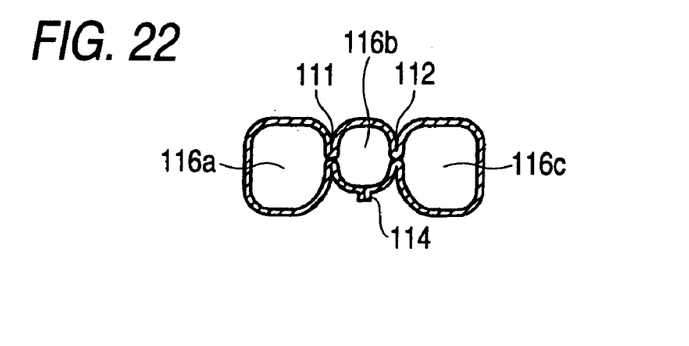
FIG. 22 is a cross-sectional view of the air bag taken along the line 22—22 thereof in FIG. 21.
Figure 23:
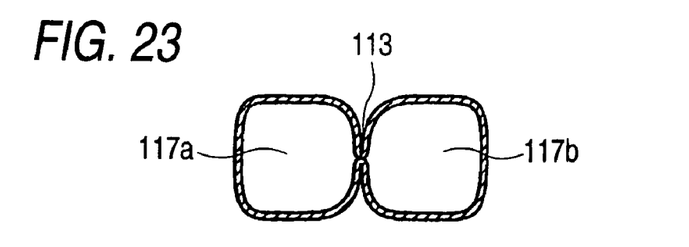
FIG. 23 is a cross-sectional view of the air bag taken along the line 23—23 thereof in FIG. 21.

FIG. 21 is a perspective view showing a completely deployed state of an air bag according to another example of the invention in which joint portions are provided, FIG. 22 is a cross-sectional view of the air bag 11 shown in FIG. 21 taken along the line 11—22 thereof, and FIG. 23 is a cross-sectional view of the air bag 11 shown in FIG. 21 taken along the line 23—23 thereof. Joint portions 111, 112 and 113 are formed by joining parts of upper and lower panels together at three locations in an air bag deployment direction in a linear fashion. A lower surface of a portion constituting a central flow path 116b is first cut partially away and then is sutured (reference numeral 114 denoting the sutured portion), and therefore the central flow path 116b becomes thinner than flow paths 116a and 116c. On the other hand, joint portion 113 separates another section of the gas flow path portion into two flow paths 117a, 117b. The gas passes through the openings 115a, 115b and 115c and then flows into a occupant restraint portion via the three flow paths 116a, 116b and 116c and then the two flow paths 117a, 117b in the gas flow path portion.

While there is no limitation to the configurations of the joint portions, a circular, oval, square, diamond or linear configuration is preferred since they facilitate the formation of the joint portions.

Both the aforesaid penetrating portions and joint portions may be provided in an air bag.

The penetrating portions and/or joint portions are preferably provided in such a manner that the capacity of air bags becomes constant in varying the sizes of air bags as required for different car types, whereby an inflator having a constant output can be used commonly for different car types. In other words, the size of the penetrating portion(s) and/or joint portion(s) is selected to achieve an appropriate flow rate of gas from the inflator into the air bag based on the size of the air bag.

In addition, in a case where an inflator with a constant output is used, the penetrating portions and/or joint portions are preferably provided in such a size that 0.1 to 0.2 second is required from sensing of a collision of the vehicle by the sensor to deflation of the air bag after it is inflated in a front barrier collision test with a test vehicle running speed of 50 to 55 km/h.

Preferably a total of cross-sectional areas of penetrating flow paths is 160 cm$^2$ or greater when portions in a gas flow path portion where the penetrating portions and/or joint portions exist are cut in a plane normal to an air bag deployment direction, and more preferably the total becomes 240 cm$^2$ or greater. With the total being less than 90 cm$^2$, not only is the air bag deployed at slower speed but also an internal pressure applied to the gas flow path portion by the gas becomes so high that there is caused a risk of the air bag being exploded.

Thus, while the air bag system according to the invention has been described heretofore with reference to the appended drawings, the invention is not limited thereto but many modifications can be made thereto without departing from the sprit and scope of the invention.

According to the air bag system of the invention, the capacity of different air bags which are required for different car types can be maintained constant by providing penetrating portions and/or joint portions which are both dimensioned into predetermined sizes. Therefore, the inflator can be used commonly on different car types while maintaining the occupant restraining performance of the air bags, whereby the production cost of air bag systems can be reduced. The air bag system of the invention is preferred for use for a front occupant air bag system.

In addition, since the capacity of an air bag can be reduced when compared with a conventional air bag of the same size, an inflator of a smaller output can be adopted, thereby making it possible to make the inflator smaller in size and lighter in weight.

What is claimed is:

1. An air bag in a folded state housed in an instrument panel, the air bag inflating by an inflator when a vehicle is crashed, the air bag comprising:

a single opening portion at one end thereof into which a gas generated by the inflator flows;

a gas flow path portion extending continuously from the opening portion; and an occupant restraint portion at an opposite closed end thereof, the occupant restraint portion having a single continuous open space therein when inflated with the gas, being spaced from the opening portion and extending continuously from the gas flow path portion, the gas flow path portion comprising a throated gas passageway between the opening portion and the occupant restraint portion, the throated passageway being narrow relative to the occupant restraint portion, whereby the gas flows from the opening portion to the occupant restraint portion through the gas flow path portion, and the gas flow path portion including at least one flow-constricting penetrating portion disposed adjacent to said opening portion, which constricts and regulates the gas flowing into the air bag, and a size of said at least one penetrating portion being selected so as to achieve a predetermined flow rate of the gas from the inflator into the air bag based on size of the air bag, and wherein said gas flow path portion of said air bag is a portion which extends only above an upper surface of the instrument panel to substantially cover the upper surface when the air bag is inflated.

2. An air bag in a folded state housed in an instrument panel, the air bag inflated by an inflator when a vehicle is crashed, the air bag comprising:

a single opening portion at one end thereof into which a gas generated by the inflator flows;

a gas flow path portion extending continuously from the opening portion; and an occupant restraint portion at an opposite closed end of the air bag, the occupant restraint portion having a single continuous open space therein when inflated with the gas and extending continuously from the gas flow path portion, the gas flow path portion comprising an elongate gas passageway between the opening portion and the occupant restraint portion which is narrow relative to the occupant restraint portion, whereby the gas flows from the opening portion to the occupant restraint portion through the gas flow path portion, and the air bag inluding at least one flow-constricting penetrating portion, disposed adjacent to the opening portion, extending therethrough, said penetrating portion being sealed in a manner such that fluid communication between the inside of the air bag and ambient air outside the bag via the penetrating portion is substantially prevented, said at least one penetrating portion is located only in the gas flow path portion, and a size of said at least one penetrating portion being selected as to achieve a predetermined flow rate of the gas from the inflator into the air bag based on size of the air bag, and wherein said gas flow path portion of said air bag is a portion which extends only above an upper surface of the instrument panel to substantially cover the upper surface when the air bag is inflated.

\* \* \* \* \*